United States Patent [19]
Ogura et al.

[11] Patent Number: 5,773,139
[45] Date of Patent: Jun. 30, 1998

[54] IMPACT RESISTANT TRANSPARENT RESIN LAMINATE

[75] Inventors: Koji Ogura, Osaka; Yoshio Tadokoro, Shiga; Yoshihide Amekawa, Ehime; Fusaharu Noma, Funabashi, all of Japan

[73] Assignee: Sumitomo Chemical Company, Limited, Osaka, Japan

[21] Appl. No.: 563,564

[22] Filed: Nov. 30, 1995

Related U.S. Application Data

[63] Continuation-in-part of Ser. No. 266,344, Jul. 1, 1994, abandoned.

[30] Foreign Application Priority Data

| Jul. 1, 1993 | [JP] | Japan | 5-163564 |
| Aug. 25, 1993 | [JP] | Japan | 5-210514 |
| Mar. 2, 1994 | [JP] | Japan | 6-032501 |
| Mar. 17, 1994 | [JP] | Japan | 6-047200 |

[51] Int. Cl.$^6$ ................................. B32B 27/36
[52] U.S. Cl. .................. 428/332; 428/412; 428/413; 428/414; 428/500; 428/520; 428/522; 428/910; 428/911; 428/913
[58] Field of Search .................. 428/412, 413, 428/414, 520, 500, 522, 332, 910, 911, 913

[56] References Cited

U.S. PATENT DOCUMENTS

| 4,052,525 | 10/1977 | Ide et al. | 428/412 |
| 4,081,581 | 3/1978 | Littell, Jr. | 428/138 |
| 4,125,669 | 11/1978 | Triebel et al. | 428/412 |
| 4,242,414 | 12/1980 | McKenzie | 428/412 |

FOREIGN PATENT DOCUMENTS

| 8633539 | 5/1987 | Germany . |
| 63-186726 | 8/1988 | Japan . |
| 4-301448 | 10/1992 | Japan . |
| 4-361034 | 12/1992 | Japan . |
| 5-025368 | 2/1993 | Japan . |
| 1-600867 | 10/1981 | United Kingdom . |
| WO 8000943 | 5/1980 | WIPO . |

*Primary Examiner*—Leszek Kiliman
*Attorney, Agent, or Firm*—Birch, Stewart, Kolasch & Birch, LLP

[57] ABSTRACT

An impact resistant transparent resin laminate having at least one methacrylate resin plate and at least one polycarbonate resin plate which are bonded with a bisphenol type epoxy resin base soft polymer, which laminate is excellent in impact resistance.

18 Claims, 1 Drawing Sheet

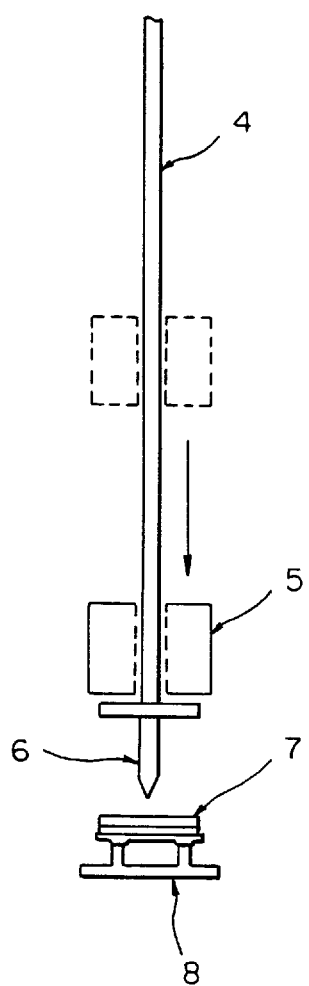

IMPACT RESISTANT TRANSPARENT RESIN LAMINATE

This is a Continuation-in-Part application of Ser. No. 08/266,344 filed on Jul. 1, 1994 now abandoned.

BACKGROUND OF THE INVENTION

1. Field of the Invention

The present invention relates to an impact resistant transparent resin laminate comprising a methacrylate resin plate and a polycarbonate resin plate which are bonded with a bisphenol type epoxy resin base soft polymer.

2. Description of the Related Art

An impact resistant transparent plate is used as a glazing member in public or athletic facilities, a screen on a counter of a bank and the like, or a glazing member of a door or various vehicles, and a wide variety of impact resistant transparent plates are known.

Among them, as an impact resistant transparent plate which protects human life from a bullet which generates a strong impact in a limited area, there are exemplified a transparent plate made of a single material such as a silicate glass plate or a transparent polycarbonate resin plate, a transparent laminate comprising at least one of a silicate glass plate and a transparent methacrylate resin plate and a transparent polycarbonate resin plate which are bonded with a methacrylate base syrup (see Japanese Patent KOKAI Publication No. 100515/1977), a transparent laminate comprising at least two polycarbonate resin plates which are bonded with at least one intermediate layer of a thermoplastic polyurethane resin which is a reaction product of a polyisocyanate and a polyester diol (see Japanese Patent Publication No. 12520/1984 and Japanese Patent KOKAI Publication Nos. 301448/1992 and 361034/1992), and the like.

But, the conventional impact resistant transparent plates do not necessarily have a sufficient protection property against a high performance gun and the like. When they are used, for example, as a bulletproof shield, their thickness should be increased to improve the impact resistance. The increase of the thickness will cause some problems such as the increase of weight in practical use.

SUMMARY OF THE INVENTION

One object of the present invention is to provide a transparent resin laminate which has a sufficient protection property against a high performance gun and the like.

Another object of the present invention is to provide a transparent resin laminate which has a good protection property when it is made thin to decrease its weight, and also maintains good transparency.

According to the present invention, there is provided an impact resistant transparent resin laminate comprising at least one methacrylate resin plate and at least one polycarbonate resin plate which are bonded with a bisphenol type epoxy resin base soft polymer.

BRIEF DESCRIPTION OF THE DRAWING

The FIGURE is a schematic view of an impact testing machine used in Examples.

DETAILED DESCRIPTION OF THE INVENTION

A methacrylate resin from which the methacrylate resin plate is formed in the present invention may be any one of conventional polymethyl methacrylate or a copolymer of methyl methacrylate with at least one other monomer copolymerizable therewith. Examples of the other monomer copolymerizable with methyl methacrylate are alkyl methacrylates having 2 to 8 carbon atoms in the alkyl group (e.g. ethyl methacrylate, propyl methacrylate, butyl methacrylate, octyl methacrylate, etc.), alkyl acrylates having 1 to 8 carbon atoms in the alkyl group (e.g. methyl acrylate, ethyl acrylate, propyl acrylate, butyl acrylate, octyl acrylate, etc.), methacrylic acid, acrylic acid, methacrylamide, acrylamide, styrene, glycidyl methacrylate, glycidyl acrylate, and the like. Preferably, a copolymer of methyl methacrylate with 10% by weight or less of glycidyl methacrylate, glycidyl acrylate or a mixture thereof is used, since a bond strength of the methacrylate resin plate to the soft polymer is improved.

The methyl methacrylate resin may be crosslinked with a crosslinking agent in an amount of 20 parts by weight or less per 100 parts by weight of the raw material monomer(s). Examples of the crosslinking agent are ethylene glycol di(meth)acrylate, tetraethylene glycol di(meth)acrylate, diethylene glycol di(meth)acrylate, trimethylolethane tri(meth)acrylate, trimethylolpropane tri(meth)acrylate, pentaerythritol tetra(meth)acrylate, allyl (meth)acrylate, and the like.

Preferably, the methacrylate resin can contain a UV light absorber to improve weather resistance or avoid the polymerization inhibition by an air during the polymerization. An amount of the UV light absorber is usually 1% by weight or less, preferably from 0.01 to 0.2% by weight based on the weight of the matrix resin.

In addition, the methacrylate resin may contain various conventional additives such as an antioxidant, a plasticizer, a chain transfer agent, or a colorant.

To improve the impact resistance of the transparent resin laminate, a multilayer type elastomeric polymer material may be compounded in the methacrylate resin plate. The multilayer type elastomeric polymer material consists of two or more layers of at least two different polymers. For example, a multilayer type elastomeric polymer material may be prepared by emulsion polymerization comprising polymerizing a monomer or monomer mixture to form an inner layer in a first step and then polymerizing a different monomer or monomer mixture to form an outer layer. A multilayer type elastomeric polymer material having a three layer structure may be prepared in the similar manner.

In the present invention, any multilayer type elastomeric polymer having inner and outer layers may be used.

Preferably, the inner layer comprises a crosslinked acrylate copolymer which is prepared by polymerizing a monomer mixture comprising 45 to 99.5% by weight of an alkyl acrylate monomer having 1 to 8 carbon atoms in the alkyl group, 0 to 40% by weight of an aromatic vinyl monomer, 0 to 10% by weight of a polyfunctional monomer and 0.5 to 5% by weight of a grafting monomer.

Examples of the alkyl acrylate monomer having 1 to 8 carbon atoms in the alkyl group are methyl acrylate, ethyl acrylate, propyl acrylate, butyl acrylate, octyl acrylate, and the like.

Examples of the aromatic vinyl monomer are α-methylstyrene, chlorostyrene, p-tert.-butylstyrene, and the like.

Examples of the polyfunctional monomer are alkylene diglycol diacrylates, such as ethylene glycol diacrylate, 1,2-propylene glycol diacrylate, 1,3-propylene glycol diacrylate, etc.; alkylene glycol dimethacrylates such as ethylene glycol dimethacrylate, triethylene glycol dimethacrylate, etc.

Examples of the grafting monomer are α,β-unsaturated carboxylic acids, and allyl esters, methallyl esters and crotyl esters of dicarboxylic acids. Among them, allyl methacrylate and diallyl methacrylate are preferred.

Preferably, the outer layer comprises an alkyl methacrylate polymer or an alkyl methacrylate copolymer which is prepared by polymerizing a monomer or monomer mixture comprising 60 to 100% by weight of an alkyl methacrylate monomer having 1 to 4 carbon atoms in the alkyl group and 0 to 40% by weight of a monomer having at least one double bond.

Examples of the alkyl methacrylate monomer having 1 to 4 carbon atoms in the alkyl group are methyl methacrylate, ethyl methacrylate, propyl methacrylate, butyl methacrylate, and the like.

Examples of the monomer having at least one double bond are alkyl acrylates such as methyl acrylate, ethyl acrylate, etc., styrene, acrylonitrile, methacrylates, 2-hydroxymethacrylates, and the like.

Preferably, the outer layer comprises an alkyl methacrylate copolymer prepared by polymerizing the alkyl methacrylate and the monomer having at least one double bond, while it may comprise the polymer of the alkyl methacrylate only.

The multilayer type elastomeric polymer material having the three layer structure comprises an innermost layer in addition to the above inner and outer layers, that is, it comprises, from the inside, the innermost layer, the inner layer (or intermediate layer) and the outer layer. In this case, the compositions of the intermediate inner layer and the outer layer are the same as those of the inner layer and the outer layer of the two-layer structure elastomeric polymer material.

Preferably, the innermost layer comprises a crosslinked methacrylate polymer which is prepared by polymerizing a monomer mixture comprising 60 to 99.8% by weight of an alkyl methacrylate monomer having 1 to 4 carbon atoms in the alkyl group, 0 to 40% by weight of a monomer having at least one double bond, 0 to 5% by weight of a polyfunctional monomer and 0.2 to 2% by weight of a grafting monomer.

Examples of the alkyl methacrylate monomer having 1 to 4 carbon atoms in the alkyl group, the monomer having at least one double bond, the polyfunctional monomer and the grafting monomer are the same as those exemplified above.

The methacrylate resin plate may be produced by melting the methacrylate resin in, for example, an extruder, or by polymerizing the methacrylate monomer by the conventional cast polymerization.

When the methacrylate resin contains the multilayer type elastomeric polymer material, the methacrylate resin plate may be produced by melting and mixing the methacrylate resin and the multilayer type elastomeric polymer material in, for example, an extruder, or mixing the monomer(s) constituting the methacrylate resin and the already prepared multilayer type elastomeric polymer material and polymerizing the monomer(s) by the cast polymerization. In each case, the above additive or additives may be added to the polymerization system.

When the methacrylate resin plate is used as the bulletproof shield or face mask, its thickness is usually from 5 to 40 mm, preferably from 10 to 20 mm, more preferably from 8 to 18 mm. When the multilayer type elastomeric polymer material is contained, a thickness of the methacrylate resin plate can be decreased to reduce the weight of the laminate, and is usually from 5 to 30 mm, preferably from 5 to 15 mm, more preferably from 8 to 13 mm.

When the methacrylate resin plate contains the multilayer type elastomeric polymer material, the content of the latter is not larger than 42% by weight, preferably from 5 to 25% by weight, more preferably from 8 to 21% by weight. When this content exceeds 42% by weight, a degree of deformation of the methacrylate resin plate increases when the impact is given to the laminate, so that an amount of energy to be transmitted to the next plate increases and then the impact resistance of the laminate is decreased. In addition, an area which receives the impact is made opaque white so that the transparency of the laminate may be deteriorated.

When the methacrylate resin plate contains the multilayer type elastomeric polymer material, it is preferred to match refractive indices of the methacrylate resin and the multilayer type elastomeric polymer material. To this end, the compositions of the monomers constituting the methacrylate resin plate and that of the multilayer type elastomeric polymer material are adjusted, or a particle size of the multilayer type elastomeric polymer material to be contained in the methacrylate resin plate is adjusted, though the refractive indices matching method is not limited to these methods.

For example, to satisfy both the transparency and appearance of the methacrylate resin plate and the impact resistance, an average particle size of the multilayer type elastomeric polymer material is preferably from 0.03 to 0.45 μm, when the average particle size is measured by a dynamic light scattering method on a latex which is diluted with water after emulsion polymerization.

As the polycarbonate resin plate to be used in the present invention, a high molecular weight thermoplastic polycarbonate and the like can be used. In particular, a polycarbonate resin comprising dihydroxydiarylalkane is preferably used since it is excellent in impact resistance.

A thickness of the polycarbonate resin plate is usually from 3 to 15 mm, preferably from 3 to 8 mm.

The impact resistant transparent laminate of the present invention is produced by bonding the methacrylate resin plate and the polycarbonate resin plate with the bisphenol type epoxy resin base soft polymer.

For example, the plates are bonded by charging, between the methacrylate resin plate and the polycarbonate plate, a mixture of 30 to 80% by weight of a bisphenol epoxy compound having at least two epoxy groups, 20 to 70% by weight of an aliphatic hydrocarbon hardener having at least two amino group, 0 to 25% by weight of a non-reactive diluent and 0 to 25% by weight of a reactive diluent, and polymerizing the mixture to form the soft polymer.

In a specific embodiment, an amount of the aliphatic hydrocarbon hardener having at least two amino group is from 45 to 65% by weight, for example, 20 to 50% by weight.

Examples of the epoxy compound having at least two epoxy groups are epoxy compounds which are prepared by reactions of epichlorohydrin with bisphenol A, bisphenol F, polyphenols or silicon-modified polyphenols; epoxy compounds which are prepared by reactions of epichlorohydrin with polyethylene glycol, polypropylene glycol, or α,ω-glycols of ethylene oxide/propylene oxide block copolymers; and mixtures thereof. Among them, a mixture of the bisphenol A epoxy compound and the bisphenol F epoxy compound is preferably used. In particular, the mixture having the high content of the bisphenol F epoxy compound is preferred because of the transparency, decrease of the resin viscosity and flexibility at room temperature.

Examples of the aliphatic hydrocarbon hardener having at least two amino groups are aliphatic diamines such as polymethylenediamine, polyetherdiamine, etc., linear or branched aliphatic polyamines such as diethylenetriamine, triethylenetetramine, 1,2-substituted diamine, substituted polyamine, dimethylaminopropylamine, aminoethylethanolamine, methyliminopropylamine, etc., alicyclic polyamine such as menthanediamine, 1,3-diaminocyclohexane, etc. Among them, polyetheramine is preferred, since it has a low viscosity and colors the resin little, and imparts flexibility to the cured resin.

The non-reactive diluent may be added to the epoxy resin to decrease the viscosity before polymerization and impart flexibility to the cured resin.

Examples of the non-reactive diluent are high boiling solvents such as xylene, glycol, etc. and plasticizers such as phthalate esters.

Examples of the reactive diluent are monoepoxides such as styreneoxide, octyleneoxide, etc., polyepoxy compounds such as diglycidyl ether, butanediol glycidyl ether, etc., and the like.

To accelerate the polymerization rate, a cure accelerator such as phenol, chlorophenol, bisphenol A, resorcinol, phenol resin, salicylic acid, triphenyl phosphite, and the like may be added to the monomer mixture of the bisphenol type epoxy resin soft polymer in an amount of 5 to 25 parts by weight per 100 parts by weight of the hardener.

During the polymerization, conventional additives such as a UV light absorber, an antioxidant, a colorant and the like may be added to the monomer mixture.

The polymerization reaction can be effected by heating the monomer mixture at a temperature of 20° to 150° C. for 10 to 20 hours, preferably at a temperature of 20° to 80° C. for 10 to 15 hours.

When the polymerization temperature is lower than 20° C., the resin may be insufficiently cured, while when it exceeds 150° C., at least one of the methacrylate resin plate and the polycarbonate resin plate may flow.

The methacrylate resin plate and the polycarbonate resin plate are bonded with the soft polymer by the cast polymerization comprising supplying the raw material of the soft polymer between the plates and polymerizing it. A mold to be used in the cast polymerization is not limited. For example, such mold can be formed by inserting a soft sealing member such as a thin tube or a tape of a soft polyvinyl chloride between the above two plates.

A thickness of the soft polymer layer which functions as a bonding material can be adjusted by selecting the thickness of the soft sealing member to be inserted between the methacrylate resin plate and the polycarbonate resin plate. The thickness of the soft polymer layer is usually from 0.1 to 4.0 mm, preferably from 1.0 to 3.0 mm. When this thickness is less than 0.1 mm, the soft polymer may be irregularly polymerized, while when it exceeds 4 mm, some problems such as the increase of a total weight of the laminate of the present invention or the increase of an amount of the materials may arise in the practical use.

The bisphenol type epoxy resin base soft polymer which is prepared as described above preferably has a glass transition temperature in the range between −50° C. and +30° C., in particular, between −20° C. and +20° C.

Preferably, the soft polymer has a 100% modulus of 5 to 150 kgf/cm$^2$ in the tensile test according to JIS K 6251.

Outside this range, the transparent resin laminate having the soft polymer may not have sufficient impact strength.

Herein, the "100% modulus" means a tensile stress generated in a sample of an elastomeric material when the sample is stretched by 100%.

A shape of the transparent resin laminate according to the present invention is not limited. In addition to a flat plate, it may be in the form of a curved plate which is prepared by the cast polymerization comprising charging the raw material of the soft polymer between the curved transparent resin plates which have been thermoformed at a predetermined radius of curvature, and polymerizing the raw material.

One or both of the surfaces of the transparent resin laminate may be treated by a conventional method such has hardening treatment or antifogging treatment.

To prevent flying of fractured pieces of the laminate when the impact is given to the laminate, a film of, for example, a polycarbonate or polyethylene terephthalate may be adhered to the surface or surfaces of the laminate.

It is possible to prevent the flying of the fractured pieces by applying a primer on the side of the methacrylate resin plate which contacts to the soft polymer intermediate layer.

Since the transparent resin laminate of the present invention has good prevention property against a bullet which generates a strong impact in a limited area, and maintains excellent transparency, it can be used as a material of a bulletproof face mask or shield, a glazing member of a door or various vehicles, a screen on a counter of a bank and the like, a glazing member in public or athletic facilities, and the like.

EXAMPLES

The present invention will be illustrated by the following Examples, which do not limit the scope of the present invention in any way.

In the Example, an impact energy was measured by the following impact resistance test:

Impact Resistance Test

The severest condition with which a transparent resin laminate encounters will be the impact energy generated by a bullet. When a bullet having a weight of 110 grains (1 grain=0.0648 gram) is fired from a 10 m distance, it has a speed of 450 m/sec. Then, the total kinetic energy of the bullet is 750 J, which is consumed to break an object.

The present invention sought to develop a transparent resin laminate which can resist to this level of energy, and an impact testing machine shown in FIG. 1, which can impart the above level of the energy to the resin laminate, was set up. This impact testing machine has a supporting rod 4, a weight 5 attached to the supporting rod 4, an cutting edge 6 attached to the lower end of the supporting rod 4, and a supporting plate 8 on which a test piece 7 is placed.

As shown in FIG. 1, a weight 5 of 30 kg was fallen on a test piece of the methacrylate resin plate side of the laminate (referred to as an "impacted side layer") to give the impact on the test piece 7. In this test, the energy is expressed as a product of the weight, the height and the gravitational acceleration. An energy, at which the methacrylate resin plate was broken and the cutting edge 6 passed through the intermediate soft polymer layer and reached the polycarbonate resin plate, namely the other side of the laminate opposite to the impacted side layer (referred to as an "opposite side layer"), was defined as an impact fracture energy.

When the impact fracture energy was 750 J or larger, the resin laminate was judged to resist the impact generated by the bullet.

The edge 6 to be used in the above test was made of stainless steel and had a tip radius of 2 mmR.

In Examples 1–5 and Comparative Examples 1–6, each test piece had a size of 100 mm square.

Example 1

(1) Composition of a raw material of a soft polymer

Main components:
 Bisphenol F epoxy compound: 42.5 % by weight
 Bisphenol A epoxy compound: 7.5 % by weight Hardener:
 Polyetheramine hardener: 50.0 % by weight (polyoxypropylenediamine)

(2) Preparation of a transparent resin laminate

A methyl methacrylate resin casted plate having a thickness of 15 mm ("Sumipex 000", a trade name, manufactured by Sumitomo Chemical Company Limited) of 300 mm square and a polycarbonate resin plate having a thickness of 6 mm ("PolycaAce ECK 100", a trade name, manufactured by Tsutsunaka Plastic Industries Limited) of 300 mm square were faced each other. Along the whole periphery of the plates, a tube of soft polyvinyl chloride resin having a diameter of 2 mm was sandwiched between the plates to form a hollow space. In the hollow space, the above raw material of the soft polymer was charged and polymerized by heating it from 20° C. to 80° C. over 10 hours to produce a resin laminate. This laminate was subjected to the impact resistance test. The result is shown in the Table.

Comparative Example 1

Three polycarbonate resin plates each having a thickness of 6 mm ("PolycaAce ECK 100", a trade name, manufactured by Tsutsunaka Plastic Industries Limited) and a polycarbonate resin plate having a thickness of 5 mm ("PolycaAce ECK 100", a trade name, manufactured by Tsutsunaka Plastic Industries Limited) were bonded with a solvent (dichloromethane) to produce a polycarbonate resin laminate having a total thickness of 23 mm. This laminate was subjected to the impact resistance test. The result is shown in the Table. By the impact, the resin laminate was greatly deformed.

Comparative Example 2

A silicate glass plate having a thickness of 23 mm was subjected to the impact resistance test. The result is shown in the Table.

Example 2

In the same manner as in Example 1 except that a methyl methacrylate resin casted plate having a thickness of 18 mm was used in place of the methyl methacrylate resin casted plate having a thickness of 15 mm, a resin laminate was produced and subjected to the impact resistance test. The result is shown in the Table.

Comparative Example 3

In the same manner as in Example 1 except that a methyl methacrylate resin casted plate having a thickness of 4 mm was used in place of the methyl methacrylate resin casted plate having a thickness of 15 mm, a resin laminate was produced and subjected to the impact resistance test. The result is shown in the Table.

Example 3

(1) Production of a methyl methacrylate casted plate containing a multilayer type elastomeric polymer material By emulsion polymerization, in a first step, a monomer mixture of 76.0% by weight of butyl acrylate, 20.0% by weight of styrene, 2.0% by weight of triethylene glycol and 2.0% by weight of allyl methacrylate was polymerized, and in a second step, methyl methacrylate was polymerized to prepare a multilayer type elastomeric polymer material. Then, 10 parts by weight of the acrylic multilayer type elastomeric polymer material was dissolved in 90 parts by weight of methyl methacrylate. To the solution, 0.1 parts by weight of 2,2'-azobisisobutyronitrile was added to polymerize the mixture by the conventional methacrylate resin plate casting method at 80° C. for 100 hours, followed by thermal treatment at 110° C. for 1 (one) hour to obtain a methyl methacrylate resin casted plate having a thickness of 10 mm.

(2) Preparation of a transparent resin laminate

The above produced methyl methacrylate resin casted plate having a thickness of 10 mm of 300 mm square and a polycarbonate resin plate having a thickness of 6 mm ("PolycaAce ECK 100", a trade name, manufactured by Tsutsunaka Plastic Industries Limited) of 300 mm square were faced each other. Along the whole periphery of the plates, a tube of soft polyvinyl chloride resin having a diameter of 2 mm was sandwiched between the plates to form a hollow space. In the hollow space, the same raw material of the soft polymer as used in Example 1 was charged and polymerized by heating it from 20° C. to 80° C. for 10 hours to produce a resin laminate. This laminate was subjected to the impact resistance test. The result is shown in the Table.

Comparative Example 4

Three polycarbonate resin plates each having a thickness of 6 mm ("PolycaAce ECK 100", a trade name, manufactured by Tsutsunaka Plastic Industries Limited) were bonded with a solvent (dichloromethane) to produce a polycarbonate resin laminate having a total thickness of 18 mm. This laminate was subjected to the impact resistance test. The result is shown in the Table. By the impact, the resin laminate was greatly deformed.

Comparative Example 5

A silicate glass plate having a thickness of 18 mm was subjected to the impact resistance test. The result is shown in the Table.

Example 4

In the same manner as in Example 3 except that a methyl methacrylate resin casted plate containing a multilayer type elastomeric polymer material having a thickness of 15 mm was used in place of the methyl methacrylate resin casted plate having a thickness of 10 mm, a resin laminate was produced and subjected to the impact resistance test. The result is shown in the Table.

Example 5

In the same manner as in Example 3 except that a methyl methacrylate resin casted plate containing a multilayer type elastomeric polymer material having a thickness of 18 mm was used in place of the methyl methacrylate resin casted plate having a thickness of 10 mm, a resin laminate was produced and subjected to the impact resistance test. The result is shown in the Table.

Comparative Example 6

In the same manner as in Example 3 except that a methyl methacrylate resin casted plate containing a multilayer type elastomeric polymer material having a thickness of 4 mm was used in place of the methyl methacrylate resin casted plate having a thickness of 10 mm, a resin laminate was produced and subjected to the impact resistance test. The result is shown in the Table.

Comparative Example 7

A transparent resin laminate was prepared in the same manner as in Example 3 except that the following composition (Composition A) was used as a raw material of the soft polymer. This laminate was subjected to the impact resistance test. The result is shown in the Table.

(Composition A)
Main Components:
   Bisphenol F epoxy compound: 41.1% by weight
   Bisphenol A epoxy compound: 7.3% by weight
Hardener:
   3- or 4-methylhexahydrophthalic anhydride: 51.4% by weight
Catalyst:
   1,8-diazabicyclo[5.4.0]undec-7-ene: 0.2% by weight Comparative Example 8

A transparent resin laminate was prepared in the same manner as in Comparative Example 7 except that the following composition (Composition B) was used as a raw material of the soft polymer. This laminate was subjected to the impact resistance test. The result is shown in the Table.

(Composition B)
Main Components:
   Bisphenol F epoxy compound: 72.6% by weight
   Bisphenol A epoxy compound: 12.8% by weight
Hardener:
   m-phenylenediamine: 14.6% by weight It is seen from the Table that the resin laminate prepared by the use of the bisphenol type epoxy resin based soft polymer according to the present invention has the much better impact fracture energy that those of the laminates prepared by the use of the hardeners which are of different types from the present invention.

TABLE

| Example No. | Impacted side layer Composition | Impacted side layer Thickness | Soft polymer Composition | Soft polymer Thickness | Opposite side layer Composition | Opposite side layer Thickness | Impact fracture energy (J) |
|---|---|---|---|---|---|---|---|
| Ex. 1 | MMA*1) casted polymer | 15 mm | Epoxy base | 2 mm | PC*2) resin plate | 6 mm | 825 |
| C.E. 1 | Polycarbonate resin | 23 mm | — | — | — | — | 792*3) |
| C.E. 2 | Silicate glass | 23 mm | — | — | — | — | 234 |
| Ex. 2 | MMA casted polymer | 18 mm | Epoxy base | 2 mm | PC resin plate | 6 mm | 895 |
| C.E. 3 | ↑ | 4 mm | ↑ | ↑ | ↑ | 6 mm | 268 |
| Ex. 3 | Multilayer elastomeric polymer cont. MMA casted polymer | 10 mm | ↑ | ↑ | ↑ | 6 mm | 835 |
| C.E. 4 | Polycarbonate resin | 18 mm | — | — | — | — | 763*3) |
| C.E. 5 | Silicate glass | 18 mm | — | — | — | — | 213 |
| Ex. 4 | Multilayer elastomeric polymer cont. MMA casted polymer | 15 mm | Epoxy base | 2 mm | PC resin plate | 6 mm | 983 |
| Ex. 5 | ↑ | 18 mm | ↑ | ↑ | ↑ | ↑ | >1000 |
| C.E. 6 | ↑ | 4 mm | ↑ | ↑ | ↑ | ↑ | 323 |
| C.E. 7 | ↑ | 10 mm | Composition A | ↑ | ↑ | ↑ | <400 |
| C.E. 8 | ↑ | ↑ | Composition B | ↑ | ↑ | ↑ | <400 |

Notes:
*1)Methyl methacrylate.
*2)Polycarbonate.
*3)Greatly deformed.

What is claimed is:

1. An impact resistant transparent resin laminate comprising at least one methacrylate resin plate and at least one polycarbonate resin plate which are bonded together with a bisphenol epoxy resin base polymer, wherein said bisphenol epoxy resin base polymer is a polymer prepared by polymerizing a mixture of 30 to 80% by weight of a bisphenol epoxy compound having at least two epoxy groups, 20 to 70% by weight of an aliphatic hydrocarbon hardener having at least two amino groups, 0 to 25% by weight of a non-reactive diluent and 0 to 25% by weight of reactive diluent.

2. The impact resistant transparent resin laminate according to claim 1, wherein said methacrylate resin is polymethyl methacrylate.

3. The impact resistant transparent resin laminate according to claim 1, wherein said methacrylate resin is a copolymer of methyl methacrylate.

4. The impact resistant transparent resin laminate according to claim 1, wherein said bisphenol epoxy resin base polymer has a glass transition temperature of −50° to 30° C. and a 100% modulus of 5 to 150 kgf/cm$^2$.

5. The impact resistant transparent resin laminate according to claim 1, wherein said methacrylate resin plate contains not more than 42% by weight of a multilayer elastomeric polymer material.

6. The impact resistant transparent resin laminate according to claim 5, wherein said multilayer elastomeric polymer material comprises an inner layer which comprises a crosslinked acrylate copolymer prepared to have 1 to 4 carbon atoms in the alkyl group, 0 to 40% by weight of a monomer having at least one double bond, 0 to 5% by weight of a polyfunctional monomer and 0.2 to 2% by weight of a grafting monomer, an intermediate layer which comprises a crosslinked acrylate copolymer prepared by polymerizing a monomer mixture comprising 45 to 99.5% by weight of an alkyl acrylate monomer having 1 to 8 carbon atoms in the alkyl group, 0 to 40% by weight of an aromatic vinyl monomer, 0 to 10% by weight of a polyfunctional monomer and 0.5 to 5% by weight of a grafting monomer and an outer layer which comprises an alkyl methacrylate polymer or an alkyl methacrylate copolymer prepared by polymerizing a monomer or monomer mixture comprising 60 to 100% by weight of an alkyl methacrylate monomer having 1 to 4 carbon atoms in the alkyl group and 0 to 40% by weight of a monomer having at least one double bond.

7. The impact resistant transparent resin laminate according to claim 5, wherein said multilayer elastomeric polymer material consists of an innermost layer which comprises a crosslinked methacrylate polymer prepared by polymerizing a monomer mixture comprising 60 to 99.8% by weight of an alkyl methacrylate monomer having 1 to 4 carbon atoms in the alkyl group, 0 to 40% by weight of a monomer having at least one double bond, 0 to 5% by weight of a polyfunctional monomer and 0.2 to 2% by weight of a grafting monomer, an intermediate layer which comprises a crosslinked acrylate copolymer prepared by polymerizing a monomer mixture comprising 45 to 99.5% by weight of an alkyl acrylate monomer having 1 to 8 carbon atoms in the alkyl group, 0 to 40% by weight of an aromatic vinyl monomer, 0 to 10% by weight of a polyfunctional monomer and 0.5 to 5% by weight of a grafting monomer and an outer layer which comprises an alkyl methacrylate polymer or an alkyl methacrylate copolymer prepared by polymerizing a monomer or monomer mixture comprising 60 to 100% by weight of an alkyl methacrylate monomer having 1 to 4 carbon atoms in the alkyl group and 0 to 40% by weight of a monomer having at least one double bond.

8. The impact resistant transparent resin laminate according to claim 5, wherein a content of said multilayer elastomeric polymer material is from 5 to 25% by weight.

9. The impact resistant transparent resin laminate according to claim 5, wherein a content of said multilayer elastomeric polymer material is from 8 to 21% by weight.

10. The impact resistant transparent resin laminate according to claim 1, wherein each of said at least one polycarbonate resin plate has a thickness of 3 to 15 mm, and wherein each of said at least one methacrylate resin plate has a thickness of 5 to 40 mm.

11. The impact resistant transparent resin laminate according to claim 5, wherein each of said at least one polycarbonate resin plate has a thickness of 3 to 15 mm, and wherein each of said at least one methacrylate resin plate has a thickness of 5 to 30 mm.

12. The impact resistant transparent resin laminate according to claim 1, wherein the epoxy compound having at least two epoxy groups is selected from the group consisting of epoxy compounds which are prepared by reactions of epichlorohydrin with bisphenol A, bisphenol F, polyphenols or silicon-modified polyphenols; epoxy compounds which are prepared by reactions of epichlorohydrin with polyethylene glycol, polypropylene glycol, or α,ω-glycols of ethylene oxide/propylene oxide block copolymers; and mixtures thereof.

13. The impact resistant transparent resin laminate according to claim 12, wherein the epoxy compound having at least two epoxy groups is a mixture of the bisphenol A epoxy compound and the bisphenol F epoxy compound.

14. The impact resistant transparent resin laminate according to claim 1, wherein the aliphatic hydrocarbon hardener having at least two amino groups is selected from the group consisting of aliphatic diamines, linear aliphatic polyamines, branched aliphatic polyamines, and alicyclic polyamines.

15. The impact resistant transparent resin laminate according to claim 14, wherein the aliphatic hydrocarbon hardener having at least two amino groups is selected from the group consisting of polymethylenediamine, polyetherdiamine, diethylenetriamine, triethylenetetramine, 1,2-substituted diamine, substituted polyamine, dimethylaminopropylamine, aminoethylethanolamine, methyliminopropylamine, menthanediamine, and 1,3-diaminocyclohexane.

16. The impact resistant transparent resin laminate according to claim 1, wherein the non-reactive diluent is a high boiling solvent or plasticizer, and the reactive diluent is a monoepoxide or polyepoxy compound.

17. The impact resistant transparent resin laminate according to claim 1, wherein an amount of said aliphatic hydrocarbon hardener having at least two amino groups is from 45 to 65% by weight.

18. The impact resistant transparent resin laminate according to claim 1, wherein an amount of said aliphatic hydrocarbon hardener having at least two amino groups is from 20 to 50% by weight.

* * * * *